United States Patent
Holbein

(10) Patent No.: US 9,937,892 B2
(45) Date of Patent: Apr. 10, 2018

(54) SEAT-BELT RETRACTOR WITH DETERMINATION OF ANGLE OF ROTATION

(71) Applicant: TRW Automotive GmbH, Alfdorf (DE)

(72) Inventor: Wolfgang Holbein, Alfdorf (DE)

(73) Assignee: TRW Automotive GmbH (DE)

( * ) Notice: Subject to any disclaimer, the term of this patent is extended or adjusted under 35 U.S.C. 154(b) by 143 days.

(21) Appl. No.: 14/778,099

(22) PCT Filed: Mar. 18, 2014

(86) PCT No.: PCT/EP2014/000729
§ 371 (c)(1),
(2) Date: Sep. 18, 2015

(87) PCT Pub. No.: WO2014/146784
PCT Pub. Date: Sep. 25, 2014

(65) Prior Publication Data
US 2016/0280180 A1    Sep. 29, 2016

(30) Foreign Application Priority Data

Mar. 20, 2013 (DE) ........................ 10 2013 004 784

(51) Int. Cl.
| | |
|---|---|
| *B60R 22/34* | (2006.01) |
| *G01P 3/488* | (2006.01) |
| *G01P 3/489* | (2006.01) |
| *G01D 5/14* | (2006.01) |
| *G01P 3/48* | (2006.01) |

(52) U.S. Cl.
CPC .............. *B60R 22/34* (2013.01); *G01D 5/145* (2013.01); *G01P 3/48* (2013.01); *G01P 3/488* (2013.01); *G01P 3/489* (2013.01); *B60R 2022/3402* (2013.01)

(58) Field of Classification Search
CPC ........................ B60R 22/34; B60R 2022/3402
See application file for complete search history.

(56) References Cited

U.S. PATENT DOCUMENTS

| | | | |
|---|---|---|---|
| 6,290,160 B1 | 9/2001 | Strobel | |
| 6,373,241 B1 | 4/2002 | Weber et al. | |
| 2004/0206194 A1 | 10/2004 | Proano | |
| 2010/0072313 A1* | 3/2010 | Maemura | ............... G01D 5/145 242/379 |
| 2011/0278905 A1* | 11/2011 | Ikeda | ...................... B60R 22/34 297/475 |
| 2012/0292417 A1 | 11/2012 | Ikeda et al. | |

FOREIGN PATENT DOCUMENTS

| | | |
|---|---|---|
| DE | 10022790 | 12/2000 |
| DE | 102007041798 | 3/2009 |

* cited by examiner

*Primary Examiner* — Sang K Kim
(74) *Attorney, Agent, or Firm* — Tarolli, Sundheim, Covell & Tummino LLP

(57) ABSTRACT

A belt retractor (10) is provided with a retractor shaft (12) and a device (26) for determining the rotational speed and/or the angle of rotation of the retractor shaft (12), with a rotating magnetic element (18), a stationary magnetic field sensor (24) and a stationary element guiding the magnetic flux (20) arranged between the rotating magnetic element (18) and the magnetic field sensor (24).

13 Claims, 2 Drawing Sheets

SEAT-BELT RETRACTOR WITH DETERMINATION OF ANGLE OF ROTATION

RELATED APPLICATIONS

This application corresponds to PCT/EP2014/000729, filed Mar. 18, 2014, which claims the benefit of German Application No. 10 2013 004 784.6, filed Mar. 20, 2013, the subject matter, of which are incorporated herein by reference in their entirety.

BACKGROUND OF THE INVENTION

The invention relates to a belt retractor comprising a retractor shaft and a device for determining the rotational speed and/or the angle of rotation.

In the case of belt retractors, especially of retracting tensioners, it is necessary for particular functions to know the angle of rotation of the retractor shaft. This is necessary, for example, for detecting the out-of-position situation, for the rotational speed monitoring and the rotational speed control of the motor for driving the tensioner or a pretensioner or for controlling the tensioning operation itself.

Usually the angle of rotation is determined by means of an artificially generated alternating magnetic field. A magnetic wheel or any other magnetic component is connected to the retractor shaft in a rotationally fixed manner so that a periodically alternating magnetic field is generated during rotation of the turning shaft. Said field is detected by means of a suitable magnetic field sensor usually a Hall sensor, and the rotational speed and/or the angle of rotation of the retractor shaft is concluded from the information obtained therefrom. The Hall sensors are fastened directly on an ECU board so that for detecting the magnetic field the entire board has to be placed as closely as possible to the retractor shaft, which entails considerable constructional problems.

SUMMARY OF THE INVENTION

It is the object of the invention to provide a belt retractor which allows a more flexible assembly of the ECU board without impairing the functional safety of the determination of the angle of rotation.

This object is achieved by a belt retractor comprising a retractor shaft and a device for determining the rotational speed and/or the angle of rotation of the retractor shaft, composing a rotating magnetic element, a stationary magnetic field sensor and a stationary element guiding the magnetic flux arranged between the rotating element and the magnetic field sensor. The invention is based on the finding that for detecting the variable magnetic field the magnetic field sensor need not be arranged directly on the rotating magnetic element so as to be capable of determining the variations of the magnetic field to a sufficiently exact extent. Rather, it is sufficient that the magnetic field sensor is arranged at a distance from the rotating magnetic element, when between the rotating element and the magnetic field sensor a stationary element guiding the magnetic flux is arranged for generating at its end facing the magnetic field sensor a magnetic field which is variable corresponding to the magnetic field on the side facing the rotating element. Thus the location of the magnetic field sensor is no longer restricted to the direct vicinity of the rotating element, which permits more constructional freedom.

Furthermore, it is sufficient to determine the rotational speed and/or the angle of rotation of a component indirectly or directly connected to the retractor shaft in a rotationally fixed manner for determining the rotational speed and/or the angle of rotation of the retractor shaft. Due to the known transmission ratios inside the belt retractor, the rotational speed and/or the angle of rotation of the retractor shaft can thus be concluded.

Preferably the element is made of magnetically soft material thus ensuring that the magnetization of the element guiding the magnetic flux can follow the venations of the magnetic field on the side facing the rotating element so as to induce a corresponding magnetic field on the side of the element guiding the magnetic flux facing the magnetic field sensor.

For example, the element is curved and/or bent so that the number of possibilities of arranging the magnetic field sensor in space is further increased.

In an embodiment of the invention the dimensions of the end face of the element guiding the magnetic flux facing the magnetic field sensor substantially correspond to the dimensions of the magnetic field sensor. This guarantees that the magnetic field starting from the end face facing the magnetic field sensor can be exactly detected.

Preferably, the end face of the element guiding the magnetic flux facing the magnetic field sensor is aligned substantially in parallel to the opposite surface of the magnetic field sensor. This ensures that the magnetic field is mostly orthogonal to the magnetic field sensor.

In a configuration variant the magnetic field sensor is a Hall sensor, especially an SMD-Hall sensor. In this way the belt retractor can be inexpensively manufactured due to the low costs of a Hall sensor.

For example, the element guiding the magnetic flux is fastened to an ECU board supporting the Hall sensor, thereby a correct alignment of the element being guaranteed at any time.

In accordance with a further embodiment of the invention, the rotating magnetic element is connected indirectly or directly to the retractor shaft in a rotationally fixed manner or is driven by the latter. Thus the rotation of the retractor shaft is transformed to a variation of the magnetic field corresponding to the angle of rotation.

Preferably, the rotating magnetic element includes more than one pair of magnetic poles and is especially designed as a magnetic wheel. This increases the variation of the magnetic field in the case of small angles of rotation of the rotating element, which results in a more accurate measurement of the angle of rotation.

According to a further embodiment, the rotating magnetic element is arranged on a drive motor, the drive shaft and/or a gearwheel of the belt retractor, thus causing the flexibility of the structure of the belt retractor to be further increased.

Preferably the belt retractor is a retracting tensioner.

BRIEF DESCRIPTION OF THE DRAWINGS

Further features and advantages of the invention will result from the following description and from the enclosed drawings which are referred to In the drawings.

DESCRIPTION

Figure 1:
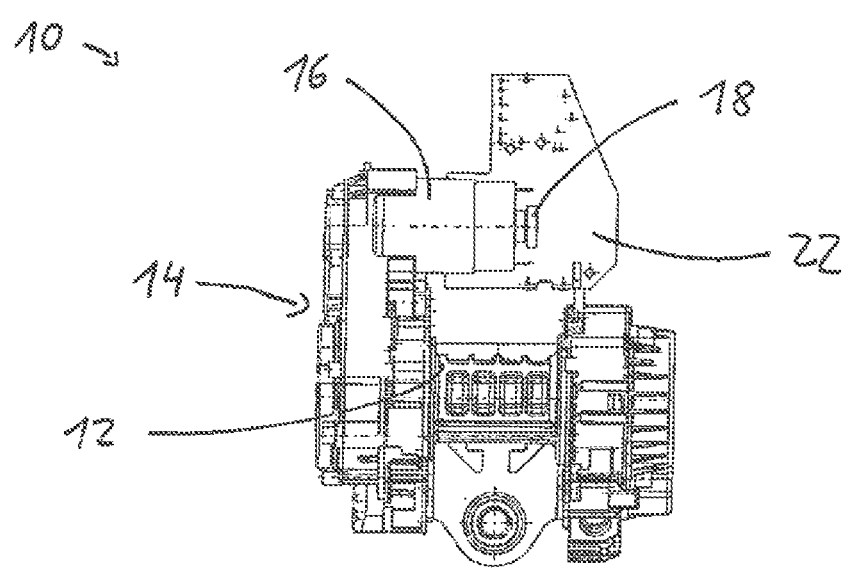
FIG. 1 shows a belt retractor according to the invention in a front view.

In FIG. 1 a belt retractor 10 is illustrated in the form of a retracting tensioner. The belt retractor 10 includes a retractor shaft 12 for receiving the seat belt (not shown) which is connected to a drive motor 16 for tensioning or pre-tensioning via a drive unit 14. A magnetic element 18, preferably a magnetic wheel, is connected to the drive motor, more exactly its drive shaft, in a rotationally fixed manner.

Figure 2:
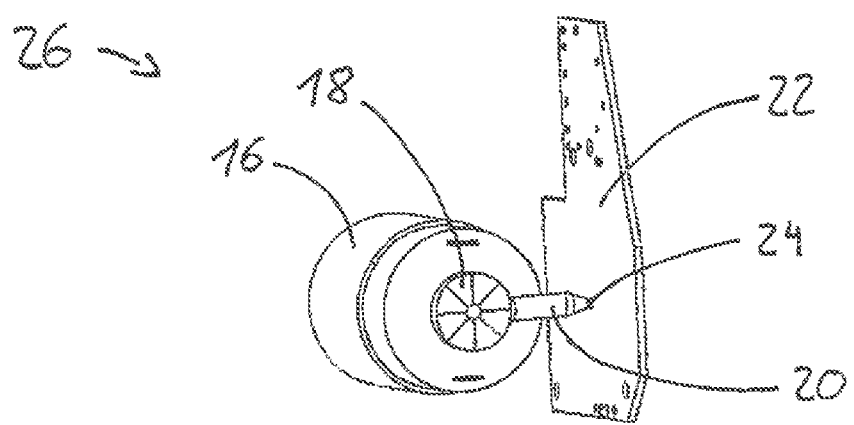
FIG. 2 shows the retractor shaft of the belt retractor according to FIG. 1 and a device for determining the rotational speed and/or the angle of rotation according to FIG. 1, FIG. 3 a view of a further embodiment of the belt retractor according to the invention including two alternative embodiments of the device for determining the rotational speed and/or the angle of rotation, and FIG. 4 a view of a partly cut belt retractor according to the invention including a further embodiment of the device for determining the rotational speed and/or the angle of rotation.

An element 20 guiding the magnetic flux which is fastened to an ECU board 22 is arranged in the direct vicinity of the magnetic element 18 (cf. FIG. 2).

On the ECU board 22 moreover a magnetic field sensor 24 is arranged. The magnetic element 18, the element 20 guiding the magnetic flux and the magnetic field sensor 24 in this case form a device for determining the rotational speed and/or the angle of rotation of the retractor shaft 12.

In the illustration of FIG. 1 the element 20 guiding the magnetic flux and the magnetic field sensor 24 are covered by the magnetic element 18, therefore it is referred to FIG. 2 which separately illustrates the device 26 for determining the rotational speed and/or the angle of rotation of the retractor shaft 12. It is evident that the magnetic field sensor 24, preferably an SMD-Hall sensor, is directly fastened to the ECU board 22. The element 20 guiding the magnetic flux is arranged between the magnetic field sensor 24 and the magnetic element 18.

The element 20 guiding the magnetic flux is made of magnetically soft material, for example of electric sheets.

Moreover, the side of the element 20 guiding the magnetic flux facing the magnetic field sensor 24 is tapered so that its cross-section approximately corresponds to the surface of the magnetic field sensor 24 sensitive to the magnetic field at its end face facing the magnetic field sensor 24, the end face further being aligned in parallel to the opposite surface at the sensor 24.

In order to determine the rotational speed and/or the angle of rotation of the drive motor 16 a magnetic field varying corresponding to the angle of rotation is generated by the magnetic element 18 connected to the shaft of the drive motor 16 in a rotationally fixed manner. The magnetic field then causes a corresponding variation of its magnetization in the element 20 guiding the magnetic flux which is arranged in direct vicinity of the magnetic element 18.

On the side of the element 20 guiding the magnetic flux facing the magnetic field sensor 24 in turn a varying magnetic field is induced due to the alternating magnetization of the element 20 guiding the magnetic flux. The variation of the magnetic field always corresponds to the rotational speed and/or the angle of rotation of the rotating magnetic element 18 and can be detected by the magnetic field sensor 24. Now the speed and/or the angle of rotation of the drive motor 16 and thus the speed and/or the angle of rotation of the drive shaft 12 can be concluded from the signal of the magnetic field sensor 24, in particular because the transmission ratio of the drive unit 14 is known.

The embodiments according to FIGS. 3 and 4 correspond to the embodiment according to FIGS. 1 and 2, wherein hereinafter only the differences shall be discussed and parts that are equal or equal in function are provided with the afore-introduced reference numerals.

Figure 3:
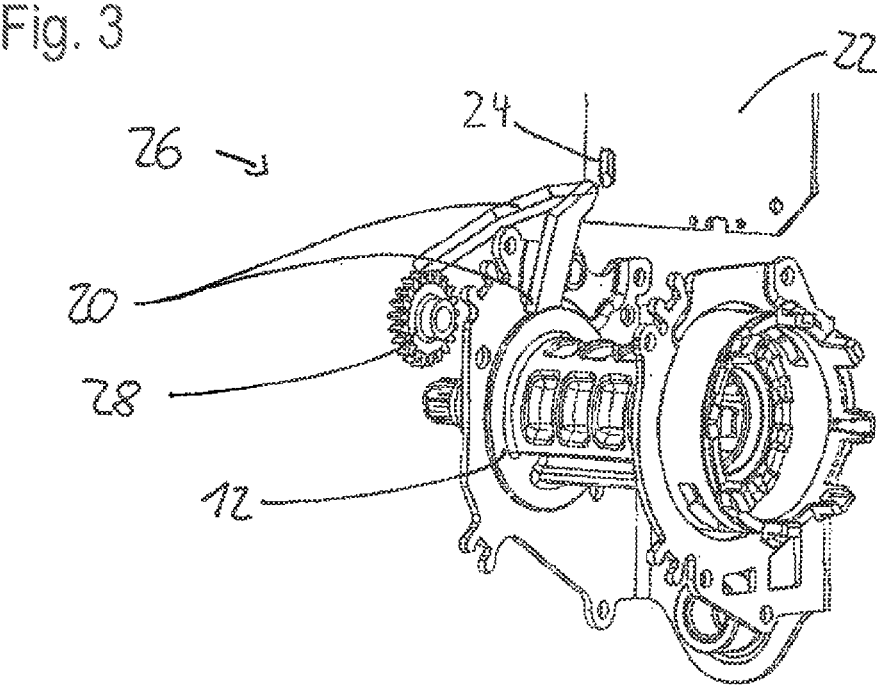

FIG. 3 illustrates two embodiments of the device for determining the speed or the angle of rotation. The magnetic field sensor 24 is arranged on the ECU board 22 in the area of the retractor shaft 12 and the magnetic element is provided directly on the retractor shaft 12 or on a gearwheel 28 of the drive unit 14 meshing with the retractor shaft 12.

For each of the two alternatives an element 20 guiding the magnetic flux is shown in FIG. 3, namely between the retractor shaft 12 and the magnetic field sensor 24 or the gearwheel 28 and the magnetic field sensor 24. The element 20 guiding the magnetic flux is bent or curved once or several times m different planes This does not influence the action of the element 20 guiding the magnetic flux so that the determination of the rotational speed and/or the angle of rotation of the retractor shaft 12 or the gearwheel 28 operates as illustrated in the first embodiment.

Figure 4:
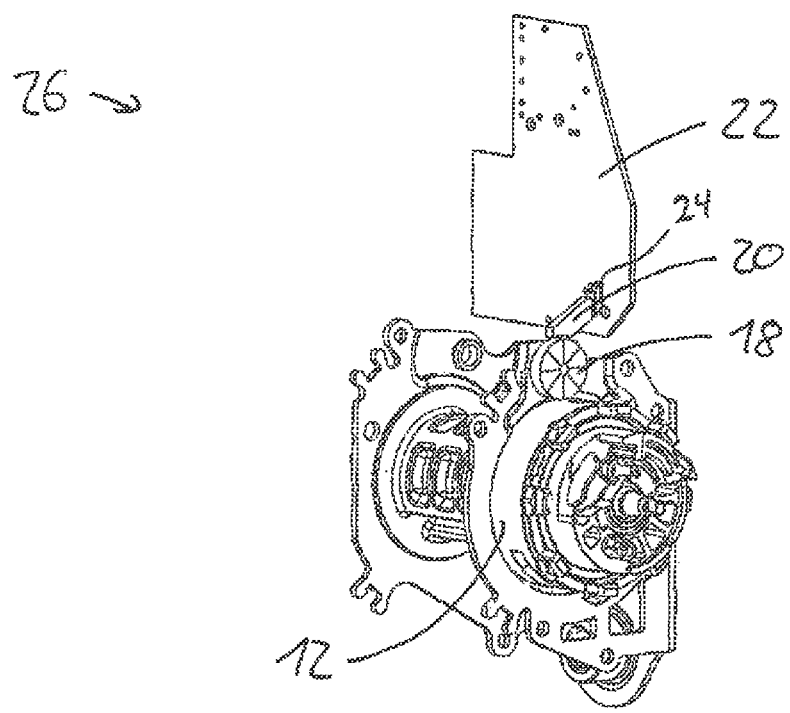

FIG. 4 illustrates another embodiment of the device according to the invention. In contrast to the previous embodiments, the magnetic element 18 is supported on a separate axle. The magnetic element 18 is in frictional closure or in form closure with the retractor shaft 12 so that rotation of the retractor shaft 12 entails rotation of the magnetic element 18. In this way the rotational speed and/or the angle of relation of the retractor shaft 12 can be concluded from determining the rotational speed of the magnetic element 18.

The invention claimed:

1. A belt retractor (10) comprising a retractor shaft (12) and a device (26) for determining the rotational speed and/or the angle of rotation of the retractor shaft (12), comprising a rotating magnetic element (18), a stationary magnetic field sensor (24) and a stationary element (20) guiding the magnetic flux between the rotating magnetic element (18) and the magnetic field sensor (24).

2. The belt retractor according to claim 1, wherein the element (20) guiding the magnetic flux is made of magnetically soft material.

3. The belt retractor according to claim 1, wherein the element (20) guiding the magnetic flux is curved and/or bent.

4. The belt retractor according to claim 1, wherein the dimensions of the end face of the element (20) guiding the magnetic flux facing the magnetic field sensor (24) substantially correspond to the dimensions of the magnetic field sensor (24).

5. The belt retractor according to claim 4, wherein the end face of the element (20) guiding the magnetic flux facing the magnetic field sensor (24) is aligned substantially in parallel to the opposite surface of the magnetic field sensor (24).

6. The belt retractor according to claim 1, wherein the magnetic field sensor (24) is a Hall sensor.

7. The belt retractor according to claim 6, wherein the element guiding the magnetic flux is fastened to an ECU board (22) supporting the Hall sensor.

8. The belt retractor according to claim 1, wherein the rotating magnetic element (18) is connected indirectly or directly to the retractor shaft (12) or is driven by the same.

9. The belt retractor according to claim 1, wherein the rotating magnetic element (18) includes more than one pair of magnetic poles.

10. The belt retractor according to claim 1, wherein the rotating magnetic element (18) is arranged on a drive motor (16), the retractor shaft (12) and/or a gearwheel (28) of the belt retractor (10).

11. The belt retractor according to claim 1, wherein the belt retractor (10) is a retracting tensioner.

12. The belt retractor according to claim 1, wherein the magnetic field sensor is an SMD-Hall sensor.

13. The belt retractor according to claim 1, wherein the rotating magnetic element is configured as a magnetic wheel.

* * * * *